US005778355A

United States Patent [19]
Boyer et al.

[11] Patent Number: 5,778,355
[45] Date of Patent: Jul. 7, 1998

[54] DATABASE METHOD AND APPARATUS FOR INTERACTIVELY RETRIEVING DATA MEMBERS AND RELATED MEMBERS FROM A COLLECTION OF DATA

[75] Inventors: Philip L. Boyer; Michael James Carey; Gerald G. Kiernan, all of San Jose, Calif.

[73] Assignee: International Business Machines Corp., San Jose, Calif.

[21] Appl. No.: 664,212

[22] Filed: Jun. 11, 1996

[51] Int. Cl.$^6$ .................................................. G06F 17/30
[52] U.S. Cl. ........................... 707/2; 707/4; 707/102; 707/103; 707/104
[58] Field of Search .................. 707/103, 4, 104, 707/5, 101, 270; 395/207, 500, 705

[56] References Cited

U.S. PATENT DOCUMENTS

| | | | |
|---|---|---|---|
| 5,093,782 | 3/1992 | Muraski et al. | 707/104 |
| 5,297,279 | 3/1994 | Bannon et al. | 707/103 |
| 5,361,350 | 11/1994 | Conner et al. | 707/103 |
| 5,384,894 | 1/1995 | Vassiliadis et al. | 707/5 |
| 5,437,027 | 7/1995 | Bannon et al. | 707/103 |
| 5,471,677 | 11/1995 | Imanaka | 707/5 |
| 5,493,671 | 2/1996 | Pitt et al. | 707/101 |
| 5,500,920 | 3/1996 | Kupiec | 707/270 |
| 5,504,885 | 4/1996 | Alashqur | 707/4 |
| 5,675,788 | 10/1997 | Husick et al. | 1/1 |
| 5,689,698 | 11/1997 | Jones et al. | 707/4 |
| 5,701,461 | 1/1995 | Dalal et al. | 707/4 |

OTHER PUBLICATIONS

Microsoft Access User's Guide for Windows, pp. 288, 291–293, 1994.
Query Processing in Advanced Database Systems, www.wi-wi.hu–berlin.de/institute/iwi/info.

*Primary Examiner*—Thomas G. Black
*Assistant Examiner*—Shahid Alam
*Attorney, Agent, or Firm*—David J. Kappos; Kudirka & Jobse, LLP

[57] ABSTRACT

A method of, and system for, interactively accessing information in response to a user command having a predefined operator and specifying one of a plurality of collections of information. The collections of information are stored in an object-oriented database in a hierarchical arrangement of data members. The hierarchical arrangement can include one level of data members and in which one of the data members is composed of a next level of data members. Each data member is stored according to one of a system-specified and a user-specified storage definition. A set of user-specified storage definitions is defined from the plurality of storage definitions. Upon detecting the user command, the specified collection of information is analyzed to determine which data members of the one level are stored according to one of the storage definitions of the set. Each data member not in the set is added to a projection list; each data member in the set is expanded into a next level of data members composing the data member in the set. Expanding can include analyzing each data member of the next level to determine whether it is in the set and if so again expanding up until a specified level of expanding. The projection list is processed to return to the user the information corresponding to the data members in the projection list. The invention may be implemented in a Parser layer of a known layered architecture for database systems.

19 Claims, 8 Drawing Sheets

```
class empClass
{ public:
        int         no ;
        float       sal;
        char        *name ;
        Address     address;
        Date        birth;
        deptClass   *dept ;
};

class deptClass
{ public:
    int                 no;
    char                name[20]
    Collection<empClass*> emps   ;
};

typedef struct
{
   char *street;
   char *city;
   char *zip;
} Address;

class Date
{
public:
        short day;
        short month;
        short year;
        char *display();
        int compare(Date*);
};

Collection<empClass*> *Emp2; // Database root
Collection<deptClass*> *Dept; // Database root
```

*FIG. 3* select * from Emp 2

| no | sal | name | address | birth | dept |
|----|-----|------|---------|-------|------|
| 66 | 660.00 | benoit | 0x40659548 | 0x40659554 | 0x406580b4 |
| 21 | 210.00 | adiba | 0x40653094 | 0x406530a0 | 0x4065008c |
| ... | | | | | |

*FIG. 4A*

Example 2 select *from Dept

| no | name | emps |
|----|------|------|
| 1 | sales | 0x40650048 |
| 2 | design | 0x4065136c |
| ... | | |

*FIG. 4B*

```
select e.no,
       e.sal,
       e.name,
       e.address..street, e.address..city, e.address..zip,
       e.birth..day, e.birth..month, e.birth..year,
       e.dept..no, e.dept..name, e.dept..emps
from Emp2 e
```

| no | sal | name | street | city | zip | day | month | year | no | name | emps |
|---|---|---|---|---|---|---|---|---|---|---|---|
| 1 | 10.00 | adiba | 555 Bailey | San Jose | 95141 | 7 | 2 | 1905 | 1 | sales | 0x40650048 |

*FIG. 5*

```
select *2 from Emp2 e
```

| no | sal | name | street | city | zip | day | month | year | no name | emps |
|---|---|---|---|---|---|---|---|---|---|---|
| 1 | 10.00 | adiba | 555 Bailey | San Jose | 95141 | 7 | 2 | 1905 | 1 sales | 0x40650048 |

*FIG. 6*

DATABASE METHOD AND APPARATUS FOR INTERACTIVELY RETRIEVING DATA MEMBERS AND RELATED MEMBERS FROM A COLLECTION OF DATA

FIELD OF THE INVENTION

This invention relates to database systems and, more particularly, to a database operator that retrieves members and related members from collections of data in an object-oriented system.

BACKGROUND OF THE INVENTION

Broadly speaking, database systems may be divided into relational and object-oriented database (OODB) systems. The invention is particularly relevant to OODB systems. Nonetheless, because many of the underlying concepts of, and much of the vocabulary used to describe, OODB systems are common to relational systems, a brief review of relational systems may be helpful, before discussing OODB systems and the invention.

A. Brief Review of Relational Systems

With reference to FIG. 2, in the relational database model, information may be conceptualized as being stored as a two-dimensional table 200 (or relation). Each table 200 is organized into several rows 210 (or tuples) and columns 230, and each row, in turn, may have several fields 220.

Interactive users and applications communicate with the database system via a predefined database language, such as SQL. For example, a user may express a query operation, such as restriction, projection, and join, to retrieve information stored in the system.

Briefly, a restriction operation specifies a table and a predicate. The predicate defines a relationship among values of the fields. Any rows having fields that satisfy he defined relationship are returned in response to the restriction query.

A projection operation, on the other hand, specifies a table and a set of the columns. From this, a new table is produced that includes only the specified columns and that excludes duplicate rows.

A join operation, unlike a restriction or projection, involves two tables, as well as a column that is common to both. From this, the join produces a new table that is a merger of the two tables on the common column.

One special-type of SQL operation is the shorthand query operator '*'. When used in a query, the * operator returns all rows of the table. In effect, '*' is a projection of all columns.

B. Brief Review of OODB Systems

OODB systems principally depart from relational database systems in their ability to manage complicated, multidimensional data arrangements. Modern software applications, such as CAD/CAM packages, often organize their data in these complicated arrangements to make more reliable and maintainable systems. To organize and manipulate the data, the applications include "hard-coded" logic with the ability to traverse the complicated data arrangements. By necessity, the software application must have some a priori knowledge of the architecture of the data arrangement of the database.

More particularly, in OODB systems, the data may be arranged as collections of objects or instances stored in accordance with user- or system-specified definitions. The user- and system-specified definitions are known by different names in the art. The C++ programming language, for example, calls the user-specified definitions classes. A class definition, although initially specified in a high-level programming language, is compiled into a machine code format for use by the system. The compiled definition is sometimes called a "meta" description, because in effect it is a description of a description.

Conceptually, a class may specify data members (a.k.a. attributes in C++) and logic members (a.k.a. member functions in C++). The data members are used to hold data, and the logic members are used to specify program logic, i.e., a sequence of program instructions. At a minimum, most classes include logic members for "getting" and "setting" the data members of an object and, in fact, this is the typical manner of storing and accessing data to a given object. Many classes include logic members that perform far more complicated operations, including creating other objects.

Each class includes at least one constructor member function, which is invoked to create objects of the class. If not explicitly specified in the class definition, the compiler will automatically create a default constructor.

When invoked, the constructor member function causes a portion of the system's storage to be dynamically allocated for the object to be created. The organization and access of the allocated portion is defined by the class definition.

For example, if a class definition, called "eg_Class," specifies three long words of storage, one called x, one called y, and one called z (a long word being a system-specified storage definition), the constructor member function would ensure that three longwords of storage are allocated for the object to be created.

The created object would further include another portion of storage to hold references to any defined logic members. Returning to the above example, eg_Class may further define a logic member called "set_x( )," which would include instructions to store a value, provided by the caller of set_X( ), at the long word reserved for data member x.

In this fashion, the below pseudo-code provides an exemplary use of eg_Class.

```
{
eg_Class      eg1_Object;    // line 1
eg_Class      eg2_Object;    // line 2
eg1_Object.set_x(1);         // line 3
eg2_Object.set_x(2);         // line 4
{
```

Lines 1 and 2 cause a constructor member function of eg_Class to be invoked, which, as outlined above, causes the creation of two objects, eg1_Object and eg2_Object. Line 3 cause the logic member set_x, defined in eg_Class, to be invoked with the value '1' and with reference to eg1_Object. The programming instructions of set_x then store the value '1' at the long word reserved for 'x' in the portion of storage corresponding to eg1_Object. Line 4 acts in analogous fashion, but only with reference to eg2_Object and with a value of '2.'

The above example is highly simplified for descriptive purposes and does not reflect typical uses of modern OODB systems. Instead, typical OODB systems use collections that involve classes having many levels of hierarchy and indirection. Rather than the relatively flat arrangement of FIG. 2 or the relatively unsophisticated example above, a typical class will involve objects created from classes that are defined using other classes and so on. For example, rather than having classes defined with simple, system-specified definitions like long words, a class may involve another user-specified definition. Moreover, these other user-specified definitions may dictate that a single portion of storage should be allocated for an object or that multiple, related portions of storage should be allocated. The use of these objects may thus necessitate referencing multiple class definitions to determine how to traverse the data arrangement and may necessitate referencing multiple portions of storage all corresponding to a single, overarching object.

For example, modern OODB systems may include something known as an embedded structure. With an embedded structure, a data member of one user-specified class is defined as an object of another user-specified class. Moreover, the definition of the data member dictates that, when an object is created from the one class, one storage region should be allocated, having a sub-region for the data member. The subregion and associated logic are known as the embedded structure, because the structure "exists" in another object's storage region.

Modern OODB systems may also include non-embedded structures. Unlike the above, with a non-embedded structure, the definition dictates that another, separate storage region should be allocated for the data member. In this case, the object would include logic for referencing the other, related, non-embedded region.

Even with the above, relatively short discussion, it is readily appreciated that OODB systems involve sophisticated data arrangements. These arrangements are further discussed below in the Detailed Description.

Even though software may exploit the powerful data arrangements of OODB systems interactive users have been at a relative disadvantage in accessing and using the data. Among other things, relatively little attention has been given to interactive query languages for OODB systems. Thus, interactive users have been unable to easily communicate with an OODB system.

One exception is an object-oriented, SQL-like language, called OO-SQL, recently proposed by Jerry Kiernan and Michael J. Carey in *Extending SQL-92 for OODB Access: Design and Implementation Experience*, OOPSLA 95 at 467–480. Another exception is the Exodus OODB system.

Exodus implements the Extra data model and defines the Excess query language. In addition to tuple constructors, which create objects of the class corresponding to the database's collection, the Extra data model provides four types of constructors: ref, own ref, set, and array. In short, these four types of constructors are used to create special referencing relationships among data entities.

More particularly, ref and own ref create pointers that allow objects of one class to directly reference objects of another class. For example, an employee object could point to a department object. Own ref adds some additional behavior in which deleting the one object will also cause the deletion of the objects referenced with the own ref pointer.

Embedded sets, a data arrangement known in the art, may be modeled using set and array constructors. For example, a department object may have an embedded set of employees.

Like relational SQL, the Excess query language provides a * operator. Unlike relational SQL in which * projects all columns, in Exodus the * operator retrieves all simple members and all members or related objects, referenced via own ref. There is no guaranty that all members of a tuple are returned; rather, it depends on how the tuple is defined. For example, if a relation has employee tuples, each including fields for employee number, salary, name, address, birth date, and department, the * operator will return any of the above fields types that are implemented using system-defined types, types that do not reference other types, or if they reference other objects via own ref. If a data member, i.e., field, is not within one of these three categories it is not returned. Any members referenced by an own ref relationship will be transitively retrieved, meaning that the own ref relationships will be traversed to their leaves of the data relationship.

Consequently, there is a need in the art for an improved method of, and apparatus for, interactively accessing data within a collection of data. Moreover, there is a need for a method and system that allows interactive users to obtain data from collections of object-oriented data in a manner that does not require the user to understand the data schema, i.e., the manner in which one piece of data is related to or defined by another piece of data.

SUMMARY OF THE INVENTION

The invention provides a system for, and method of, interactively accessing information from a collection of information in response to a user command having a predefined operator and specifying one of a plurality of collections of information in which the collections of information is in an object-oriented database in a multi-level hierarchical arrangement of data members. One level of the hierarchical arrangement is composed of data members in which one of the data members is composed of a next level of data members. Each data member is stored according to one of a system-specified and a user-specified storage definition.

A set of user-specified storage definitions is defined from the plurality of storage definitions. An exemplary embodiment, for example, defines a set in which the storage definitions in the set have values stored at the data members that are only intelligible to the software, and not to an interactive user.

Upon detecting the user command, the invention analyzes the collection of information, specified in the user command, to determine which data members of the one level are stored according to one of the storage definitions of the set. For each data member not in the set, the invention adds the data member to a projection list; for each data member in the set, the invention expands the data member into the next level of data members composing the data member in the set.

The data members of the next level are similarly analyzed to determine whether or not they are in the set. The ones that are not are added to the projection list. The ones that are may be again expanded, if desired. One embodiment of the invention allows the user command to specify the depth of traversal, which would limit the possible number of times a data member could be expanded.

The projection list thus formed is then processed to return the information corresponding to the data members in the projection list to the user.

BRIEF DESCRIPTION OF THE DRAWINGS

In the Drawing,

FIG. 3 illustrates a data arrangement for an OODB system;

FIGS. 4A–B provide hypothetical output displays of a proposed system;

FIG. 5 provides a hypothetical output display of a proposed system;

FIG. 6 provides a hypothetical output display of an exemplary embodiment of the invention;

DETAILED DESCRIPTION OF A PREFERRED EMBODIMENT

The invention provides a method of, and apparatus for, interactively accessing information in an OODB system. More particularly, the invention provides a new projection operator, which fully retrieves nested data and other complicated data relationships up to a user-specified depth in a data hierarchy.

Figure 1:
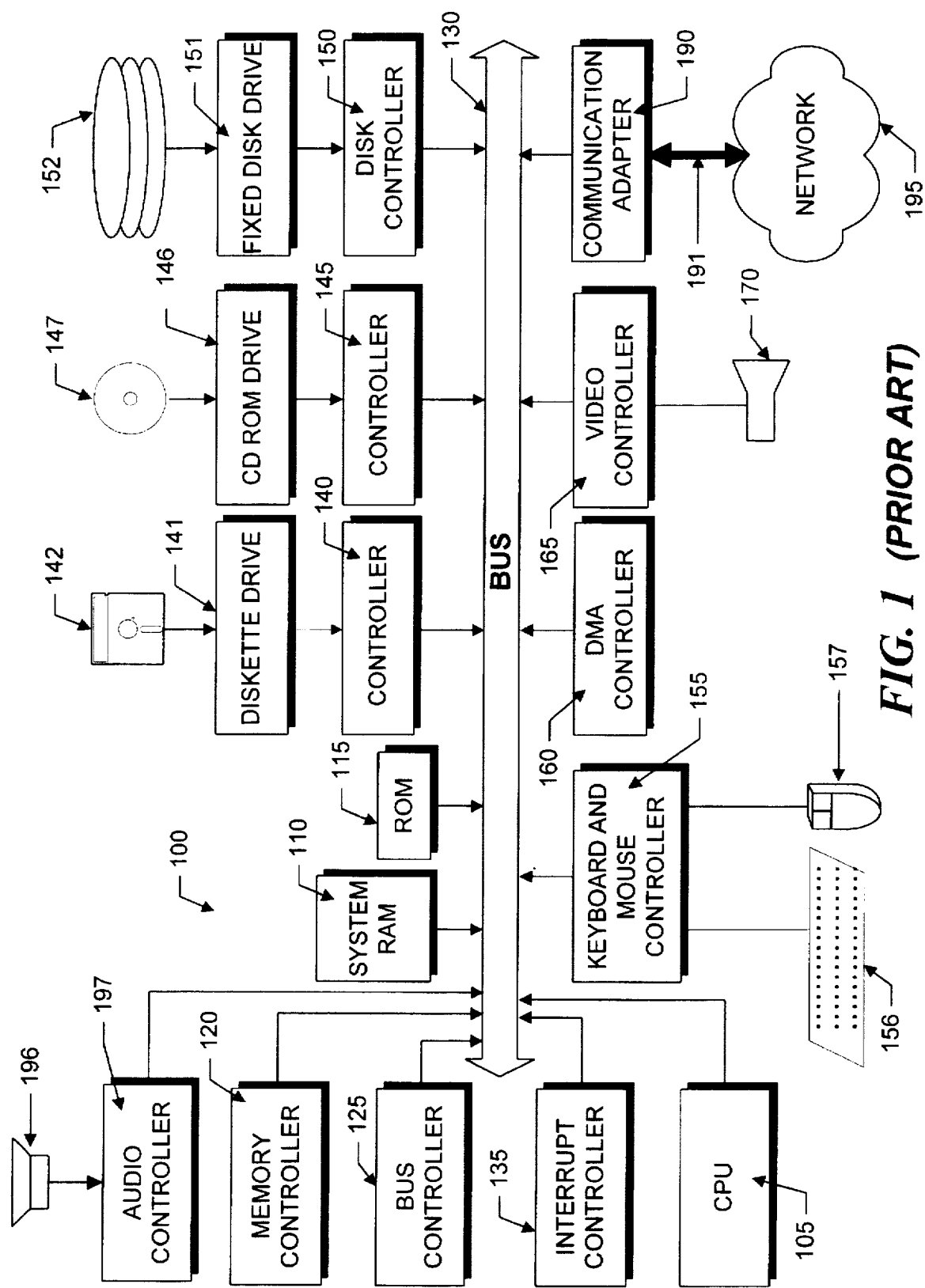
FIG. 1 illustrates a computer system on which the invention may be realized.

The invention may be implemented on system like the one shown in FIG. 1. The exemplary computer system of FIG. 1 is for descriptive purposes only. Although the description may refer to terms commonly used in describing particular computer systems, such as in IBM PS/2 computer, the description and concepts equally apply to other systems, including systems having architectures dissimilar to FIG. 1.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RAM 110.

A bus 130 interconnects the components of computer system 100. A bus controller 125 is provided for controlling bus 130. An interrupt controller 135 is used for receiving and processing various interrupt signals from the system components.

Mass storage may be provided by diskette 142, CD ROM 147, or hard drive 152. Data and software may be exchanged with computer system 100 via removable media such as diskette 142 and CD ROM 147. Diskette 142 is insertable into diskette drive 141 which is, in turn, connected to bus 30 by a controller 140. Similarly, CD ROM 147 is insertable into CD ROM drive 146 which is, in turn, connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tabloid may be connected to bus 130 and an appropriate controller and software, as required. DMA controller 160 is provided for performing direct memory access to RAM 110. A visual display is generated by video controller 165 which controls video display 170. Computer system 100 also includes a communications adaptor 190 which allows the system to be interconnected to a local area network (LAN) or a wide area network (WAN), schematically illustrated by bus 191 and network 195.

Operation of computer system 100 is generally controlled and coordinated by operating system software, such as the OS/2® operating system, available from International Business Machines Corporation, Boca Raton, Fla. The operating system controls allocation of system resources and performs tasks such as processing scheduling, memory management, networking, and I/O services, among other things.

To better understand the invention, an exemplary use of the invention is first described in comparison to conventional techniques. Afterwards, an exemplary architecture and implementation are described.

A. An Exemplary Use of the Invention

Figure 2:
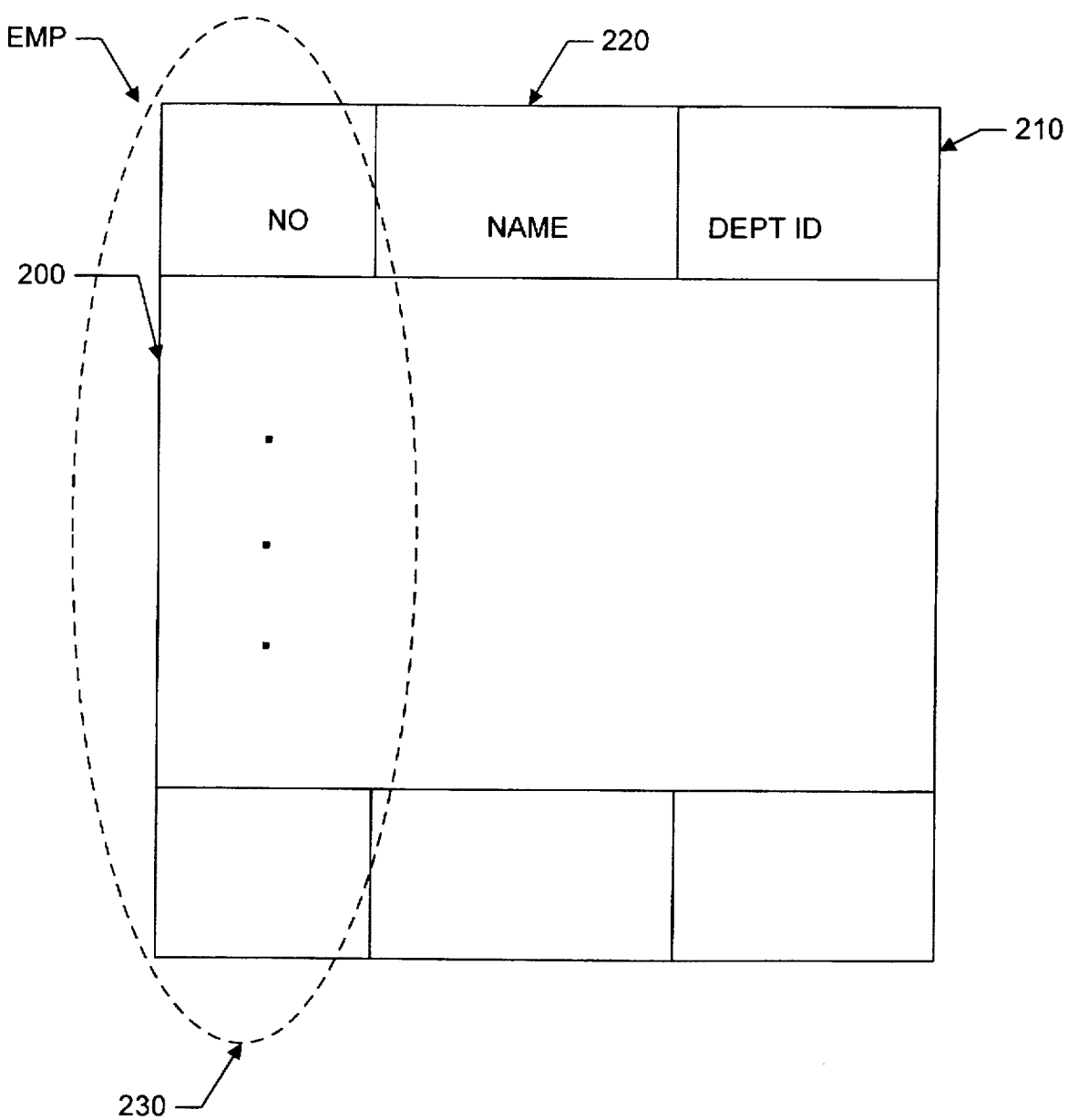
FIG. 2 illustrates a prior art relational data arrangement.

As outlined above, in SQL relational systems, the * operator is a shorthand operator that retrieves all fields in a relation. The end-user need not enumerate, or even know of, the names of the various columns 230 of a table 200. For example, referring to the relation Emp of FIG. 2, a relational query operation "select * from Emp" is shorthand for selecting the employee number, name, department identification, i.e., "select_no., name, dept_id." Every row will be produced, each row including every field.

As outlined above, in contrast to the relatively simple two dimensional arrangements of relational systems, OODB systems involve more complicated, more powerful, multi-dimensional data arrangements. These arrangements may include pointers, embedded classes, conventional C-style structures, simple types, and nested collections.

FIG. 3 illustrates an exemplary OODB data arrangement, which is multi-dimensional and includes nested and embedded structures, among other things. This type of multi-dimensional, nested arrangement does not map well to the two-dimensional, relational paradigm of FIG. 2. Many of the data definitions, in particular "empClass," "Address," "Date," and "deptClass," are user-specified, and others, in particular, "int," "float," and "char," are system-specified. Even though this exemplary arrangement is relatively simple in comparison to "real-world" arrangement, it suffices as a descriptive example of using the invention.

The two collections of data are "Emp2" and "Dept." These collections are created using the template "Collection," with the associated classes empClass and deptClass, provided as construction parameters. The general concept of collections and collection templates are known in the OODB art. For example, a Collection template is provided by Object Store, available from Object Design Inc.

Most of the data members of empClass are self-explanatory. For example, "no," "sal," and "name" represent an employee's number, salary, and name using system-specified definitions int, float, and a pointer to a character string. In turn, as is known in the art, an exemplary integer type may allocate 32 bits of storage and be interpreted by the software and hardware as being of a certain format, while a float definition on the other hand, may dictate that 32 bits of storage allocated but in a different format.

Some of the members of empClass are slightly more complicated. For example, the address member involves a user-specified definition "Address." As seen in FIG. 3, Address is defined as a C-style structure, including strings for storing the street, city, and zip code. Consequently, when an instance of empClass is created, i.e., an empClass object, the data member "address" will involve storage for holding the three string pointers. Moreover, because the Address instance is embedded, i.e., "address" is not a pointer to an Address structure, the instance of empClass will have the three string pointers within the storage region allocated for the empClass instance.

The data member "birth" uses a user-specified class definition Date. Date, although relatively simple, illustrates a class's ability to encapsulate both data members, e.g., day, month, and year, and logic members, e.g., compare( ). Like address, birth involves an embedded structure. Date. Consequently, when an instance of empClass is created, a portion of the storage allocated for that instance will hold the data members defined by Date and will hold references to the logic members defined by Date.

The member "dept" is a pointer to an instance of deptClass and does not involve an embedded structure. The deptClass instance, therefore, does not exist in the storage area allocated for the instance of empClass. Instead, the deptClass instance exists in a separate storage location and the data member dept references this location. Among other things, the data member dept involves an inverse relationship with the emps member in the class deptClass. That is, dept references an instance of deptClass, which includes a collection of employees as part of its definition.

Given the above exemplary arrangement, FIG. 4A illustrates a hypothetical output using a * operator having the behavior of the OO-SQL system. Like the relational queries, the * operator returns all the data members in the qualified collection Emp2. Analogously, FIG. 4B illustrates the output of using the * operator over the Dept collection.

Query results of simple, system-specified definitions, i.e., "no," "sal," and "name," are returned as meaningful values in the corresponding defined format. However, the more elaborate definitions, such as address, birth, and dept, are returned with unintelligible values. In particular, the values returned for the more elaborate definitions are only meaningful to the software, for example, as a reference to a storage location.

Likewise, in FIG. 4B, a pointer to the nested collection of employees, emps, in each department is returned. Similarly to FIG. 4A, the pointer values are not very meaningful for interactive queries.

To obtain useful results, an end-user could explicitly enumerate the data members in the select clause of the SQL query, for example, by using something known as a path expressions. Path expressions allow traversal through pointers, embedded classes and embedded structs, multivalued collections, and relationships to reach nested data members. For example, the SQL3 proposal uses the notation " . . . " to specify traversal through embedded structures and user-specified classes (called abstract data types, or ADTs, in the proposal). If, for example, "address" is an instance of Address, then e.address. .zip expresses the traversal through Address to obtain the data member "zip." Path expressions can appear anywhere that a column may be expressed, and in general terms, a path expression takes the form $q.m_1 \ldots m_2 \ldots m_i \ldots m_n$ where q is a "correlation name" defined over a collection C, and $m_1$ is a member of the class used to create instances for collection C, and where $m_i$ is a member of the class of $m_{i-1}$. A member $m_i$ can be a data member or a logic member. (for present purposes a correlation name may also be considered as a quantified variable, a table name, a view name, a qualifier, a range variable, or any other analogous entity.)

A path expression evaluates to the value of the leaf of the expression. For example, in the path expression e.address . . . zip, "address" is a member in the class empClass used to define a collection Emp2, and "e" is a row or more properly a tuple of the collection; analogously, zip is a member of the class Address used to define "address." The expression e.address . . . zip returns the value of zip, rather than an unintelligible pointer value.

Using path expressions, the query of FIG. 4A may be modified to the query illustrated in FIG. 5 to retrieve more meaningful information. To perform this query, the interactive user has to have a priori knowledge of the data arrangement, so that the path expression may be correctly specified. As shown, by fully specifying the various path expressions, the various database data entities are returned. Notice that "e.birth . . . emps" involves the attempted return of a collection, defined by deptClass. A collection of data cannot be returned and instead a pointer to the collection is returned.

Unfortunately, as shown above, path expressions place the onus on the interactive user of specifying the expressions so that the system may traverse the embedded structures, pointers, and the like to retrieve the information. As a general matter, this greatly impairs the desirability of the system, because many end-users are solely interested in the eventual data values and not in knowing the schematic details of a data arrangement. Requiring all users to understand the data organization, places a demand on many users that they would rather not have.

To this end, the instant invention introduces a new projection operator $*^n$. The n superscript explicitly defines the depth in the data arrangement that the system should traverse to return data from a qualified collection, e.g., "e."

Thus, the hypothetical query "$*^2$" produces the qualified output illustrated in FIG. 6. The query causes the system to traverse the collection "e" through a depth of two. The depth-two traversal of $*^2$ returns all of the data values that the much more complicated query of FIG. 5 returned, but requires far less user input and requires no knowledge of the data arrangement.

With the query of FIG. 6, the system performance operates akin to automatically replacing the columns, e.g., "address," that are pointers and embedded structures with path expressions that reach the data members that they contain. This automatic replacement is repeated up to the specified level n. For example, the address data member is replaced by the path expressions "e.address . . . street," "e.address . . . city," and "e.address . . . zip," because Address contains members street, city, and zip. The data members "birth" and "dept" are handled analogously.

For the exemplary arrangement of FIG. 3, increasing the value of n beyond two would yield no extra data members, because the data arrangement is only two deep. However, as explained below, supplying a value greater than two would not cause logic errors.

Like FIG. 4A, the query of FIG. 6 returns a pointer values for the emps collection member, within the deptClass instance pointed to by dept. This is not a logic error; instead it is an artifact of what a collection really is, a pointer to a set of information.

One embodiment obtains full closure over an arrangement by using a value of n that is larger than the depth of the arrangement.

B. The Architecture and Implementation

Figure 7:
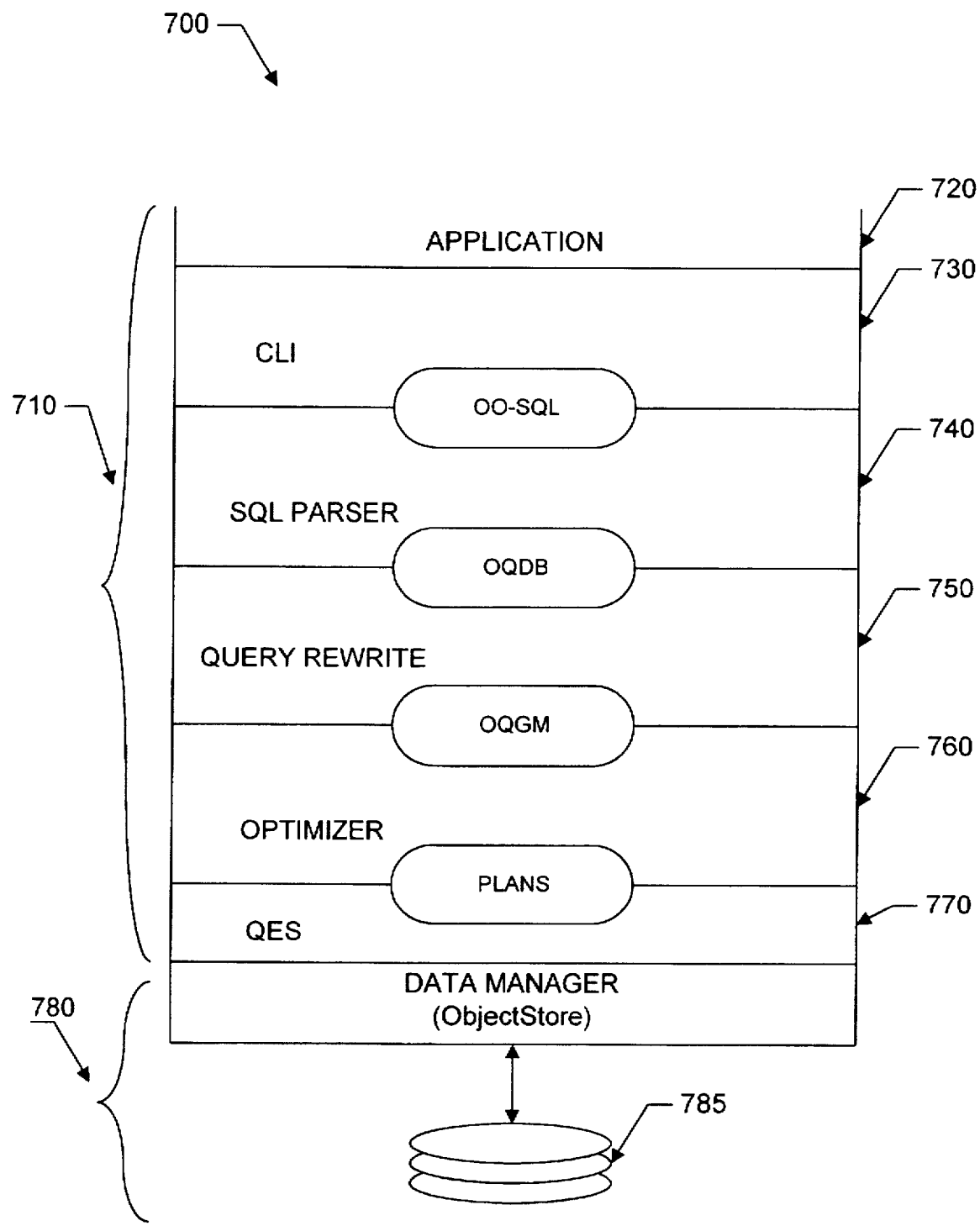
FIG. 7 illustrates the architecture of an exemplary embodiment of the invention.

The invention is realized within a predefined layer of software of a modern OODB query engine architecture and does not require major restructuring of modern OODB systems. To this end, a brief outline of modern layered OODB query engine architecture is presented with reference to FIG. 7.

The overall architecture 700 includes the query engine 710 for processing a query and the OODB back-end 780. Group 710 includes application layer 720, Call Level Interface layer 730, SQL Parser layer 740, Query Rewrite layer 750, Optimizer layer 760, and Query Evaluation Subsystem 770. Back-end 780 includes Data Manager software as well as the data storage element(s) 785.

Application layer 720 constructs a query as a text string, for example, in accordance with the OO-SQL query format.

This SQL text string may be retrieved, for example, from an interactive user in the case of an interactive application, or it can be constructed by a more complicated application, such as a CAD/CAM package. Once the query string is constructed, the application layer 720 provides it to the call level interface 730.

The CLI 730 is an interface to the underlying processing layers that perform the "real" query activity. The CLI expects the strings to be in accordance with a predefined query language, such as OO-SQL, but provides no real processing on the string. The CLI 730 provides the SQL string to SQL Parser 740 and, in effect, decouples the application from needing to know how to use and interact with the Parser 740 and lower layers.

SQL Parser 740 provides the first real processing on the query string. The Parser 740 uses conventional lexical analysis techniques to recognize various keywords and operators, defined by the query language, as well as operators within the query string. The Parser 740 builds a sequence of tokens to represent the query, each token representing a query element; for example, a given token may represent a certain keyword, e.g., "select," while another may represent an operand, e.g., "e."

The token sequence is then analyzed by other parser logic to determine whether the token sequence is consistent with certain predetermined grammar rules, defined by the underlying query language e.g., OO-SQL. This latter parser logic, in short, determines whether the query string makes sense grammatically: it does not analyze the semantics of the query. (For example, the English sentence "book walks dog" satisfies a grammar rule for sentence structure because it follows the paradigm of "noun/subject; verb; noun/object," yet has questionable semantic validity.)

During the above multi-pass Parser analysis, Parser 740 builds a query graph model (OQGM). The OQGM is, in some sense, the first internal representation of the semantics of the query.

The query rewrite layer 750, in turn, analyzes the OQGM in an attempt to rewrite the original query to a more efficient query. The original OQGM follows the semantics, specified by the user or application. There is little assurance, however, that the user has expressed the original query in a form that can be efficiently processed. The query rewrite layer 750 goes through the OQGM in an attempt to recognize certain aspects that are known to be inefficiently expressed, and upon detecting such aspects, the rewrite layer applies certain predefined expert rules to reconstruct the query to a more efficient OQGM to process. The new OQGM, although more efficient, retains the same semantics as the original OQGM.

Though not mentioned above, the OO-SQL language includes a view facility to create views on a database. A view is a user-selected subset of the database data members together with user-defined relationships between the data members. Views are advantageous for several reasons, including their ability to allow relational tools to access data residing in an OODB, by constructing a view on the OODB that appears as a simple relational table. The view facility makes it possible for different users or user groups to have different perspectives on the very same object data. In the OO-SQL language views can have reference- and collection-valued members that are based on other views instead of just on C++ class types.

In implementations using OO-SQL or analogous languages, the query rewrite layer "folds" in view information, as part of the rewrite processing. The improved query, in such cases, resolves all references in the query down to a table level and excludes virtual collections and the like which otherwise exist as a result of the view facility.

Optimizer layer 760 receives a OQGM and, from this, constructs an executable plan. The executable plan converts potentially complicated queries of the graph model into simple, low-level operations.

The QES layer 770 executes the plan by applying the low-level operations to the database engine, that is, back-end 780, for example the Object Store data manages system, available from Object Design Inc. The data manager of the back-end retrieves the requested data from the physical storage elements and performs corresponding control function to ensure data coherency and the like. Once the data is retrieved from the storage elements 785, it is migrated back through the layers to the application 720.

Although the inventive operator may be realized in various forms in any one of the several layers, an exemplary embodiment includes projection processing logic in Parser layer 740. Upon detection of the new projection operator ("*") in a query, the inventive logic first determines whether data definitions used in the query are of a first type or a second "leaf" type. Data definitions of the first type are included within a set "S" which contains generalized storage definitions of data members that require additional expansion. For example, such definitions might include "embedded structures," "embedded classes," "pointers to a class" and other similar definitions. The information in class S can be gathered during the compilation of the class definitions.

The inventive logic then processes definitions which must be expanded until either leaf types are reached or the expansion has proceeded to the specified level. The processing logic contained in the Parser layer 740 is provided below in pseudo-code format:

```
S = {embedded struct, embedded class, pointer to a class, . . . } // aggregation types
//
// Main Routine
//
{
DO FOR each quantifier q_i participating in the query
    DO FOR each data member, D, in q_i
        expand (D, N)      // N is derived from the level specified in the
                           // projection operator
    ENDIF
    ENDDO
ENDDO
}
//
// Secondary expansion routine
```

```
//
expand (D, N)
{
IF N > 1 AND the definition used to create D is in S THEN
    DO FOR each data member D' used in the definition of D
        expand (D', N - 1)
    ENDDO
ELSE
    ADD D to the projection list
ENDIF
}
```

The above projection processing logic is invoked in response to the Parser logic detecting the $*^n$ operator. Other than the projection processing logic, the other Parser logic and the other OODB logic may remain conventional. For example, the above logic and the following description refers to a projection list. This list specifies those entities involved in a projection operation, outlined above, in which the projected entities are provided to the user while also excluding duplicates.

Figure 8A:
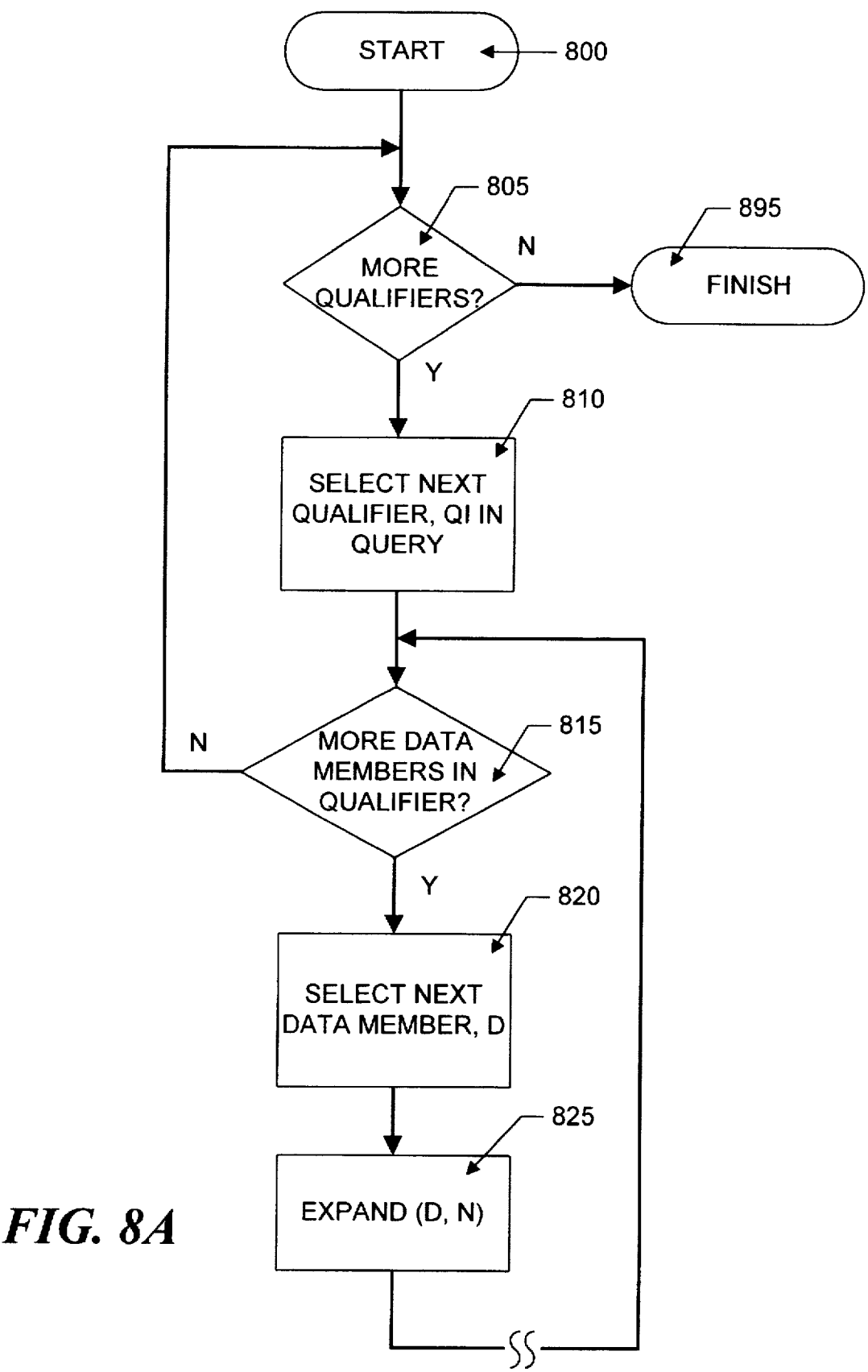
FIGS. 8A–B is a flow chart of an exemplary embodiment.

The above pseudo-code is described below with reference to FIGS. 8A–C. Upon detecting the operator $*^n$, the logic begins at step 800 and proceeds to step 805, where it is determined whether there are more qualifiers in the query. In the above examples of FIG. 6, there was only one qualifier "e." If there are no more qualifiers the logic ends at step 895. If there are more qualifiers, the logic proceeds to step 810, where the next qualifier is selected.

The selected qualifier, q, is then analyzed in step 815 to determine whether there are more data members. If not, the logic branches back to step 805 to determine whether more qualifiers need to be projected. If so, the next data member, D, within the qualifier q is selected in step 820.

The selected data member D is then expanded in step 825, which is described below with reference to FIG. 8B. The break in the line exiting box 825 indicates an interruption in control corresponding to the call to the expand routine. When the expand routine returns control to the logic of FIG. 8A, the logic proceeds along the line with the break, namely to return to the loop beginning with step 815.

Figure 8B:
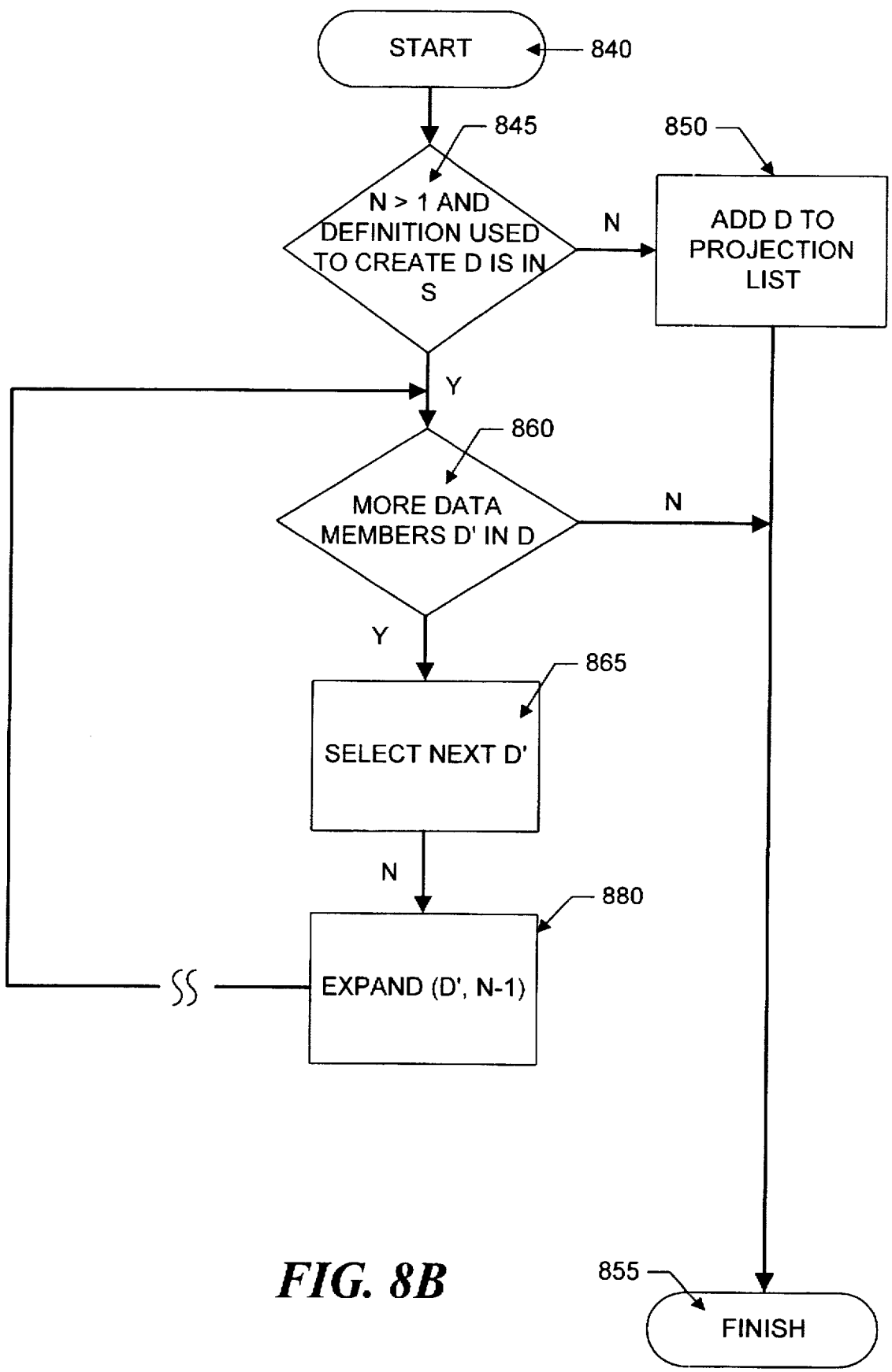

As stated above, FIG. 8B illustrates the logic for expanding a data member. When invoking the expand logic, the data member as well as a value n are provided. For example, upon an initial invocation n equals the value of "n" supplied as part of the $*^n$ operator.

The expand logic begins with step 840 and proceeds to step 845, where the value N is analyzed to see if it is greater than '1.' If not, the specified level of expansion has already been attained, and the logic proceeds to step 850.

In step 850, the data member is added to the projection list. This addition is performed regardless of whether the class definition falls within S. This is so, because the specified level N has been attained, which implies that no further expansion is desired by the user, and that he or she is willing to accept whatever values are returned for the level of expansion requested. The logic then proceeds to step 855, where control is returned to whatever logic invoked the expand logic, for example, step 825 in FIG. 8A.

If N is greater than '1,' the logic proceeds to step 860, where the data member D is analyzed to determine whether it has more data members D'. As described above, this is often the case in the multi-dimensional arrangements used in OODB. That is one data member of an object may, in turn, be an object, having several data members and so on. If D has no more data members the logic proceeds to step 855, where control is returned to the invoking logic, e.g., 825.

If there are more data members in D, the logic proceeds to step 865, where the next data member D' within D is selected. The logic proceeds to step 880, where the expand logic is again invoked (i.e., recursive invocation of the pseudo code of FIG. 8B) with D' and N−1 as call parameters, not with D and N. This in effect traverses to the next level in the data hierarchy. As outlined above, the expand logic will determine whether it has traversed as far as desired, by checking, in this case, N−1, to see if it is greater than '1'. Thus, if the operator were $*^2$ the traversal would be far enough and the data member would be added to the projection list. Similarly to that described above, the break in the line exiting box 880 indicates a break in control corresponding to the invocation (in this case recursive) of the expand logic. When the expand logic returns, the logic will proceed to the loop beginning with step 860.

The above pseudo-code and figures illustrates the secondary routine, expand ( ), as a recursive algorithm, because recursive algorithms are generally more concise and easer to understand than non-recursive algorithms. However, skilled artisans can easily formulate non-recursive algorithms from the above, if desired. As can be readily seen, a very large n may be provided to attain full closure over a collection. The above pseudo-code illustrates that even if a very large n is provided, i.e., deeper than the arrangement, the algorithm returns from processing once all columns have been reconciled as not falling in S or when the n-level traversal is reached. Consequently, if a very large n is provided, the algorithm will return with full closure, once all elements are resolved as not falling in S.

The processing of the projection list is handled by subsequent layers 750–780. Namely, both the Query Rewrite layer 750 and the optimizer 760 analyze the OQGM provided by the Parser layer in an attempt to more efficiently yield the same projection as that specified in the projection list.

Although only one embodiment has been explained in detail herein, other changes and modifications will be immediately apparent to those skilled in the art. The following claims are intended to cover those additional modifications and changes which are apparent to those skilled in the art.

What is claimed is:

1. A method of interactively accessing information stored in a memory in response to a user command having a predefined operator, the user command causing a computer system to operate on an object-oriented database including first data members of a first data member type, the first data members being composed of other data members and the database including second data members of a second data member type, the second data members not being composed of other data members, the method comprising the steps of:

A. analyzing the database to identify data members of the first data member type and data members of the second data member type;

B. using each data member of the second data member type to retrieve information from the database;

C. replacing each data member of the first data member type by data members which compose the data member of the first data member type; and D. repeating steps B and C for each of the other data members of the first data member type.

2. The method of claim 1 wherein the predefined operator includes a predetermined number of replacements and wherein step D comprises the step of:

D1. repeating steps B and C while data members of the first data member type remain or until the predetermined number of replacements have been performed.

3. The method of claim 1 wherein step B comprises the steps of:

B1. adding each data member of the first data member type to a projection list; and B2. using the projection list to retrieve information from the database.

4. The method of claim 1 wherein the first data member type comprises a set of user-specified storage definitions.

5. The method of claim 4 wherein the set of user-specified storage definitions includes an embedded structure definition.

6. The method of claim 4 wherein the set of user-specified storage definitions includes an embedded class definition.

7. The method of claim 4 wherein the set of user-specified storage definitions includes a reference to a class definition.

8. Apparatus for interactively accessing information stored in a memory in response to a user command having a predefined operator, the user command operating on an object-oriented database including data members of a first data member type which data members are composed of other data members and data members of a second data member type which data members are not composed of other data members, the apparatus comprising:

means responsive to the predefined operator for analyzing the database to identify data members of the first data member type and data members of the second data member type;

means for replacing each data member of the first data member type by other data members which compose the each data member and repeating the replacement on the other data members; and means responsive to each data member of the second data member type for retrieving information from the database.

9. The apparatus of claim 8 wherein the predefined operator includes a predetermined number of replacements and wherein the replacing means comprises means for replacing data members while data members of the member type remain or until the predetermined number of replacements have been performed.

10. The apparatus of claim 8 wherein the retrieving means comprises:

means for adding each data member of the first data member type to a projection list; and means responsive to the projection list for retrieving information from the database.

11. The apparatus of claim 8 wherein the first data member type comprises a set of user-specified storage definitions.

12. The apparatus of claim 11 wherein the set of user-specified storage definitions includes an embedded structure definition.

13. The apparatus of claim 11 wherein the set of user-specified storage definitions includes an embedded class definition.

14. The apparatus of claim 11 wherein the set of user-specified storage definitions includes a reference to a class definition.

15. A system for interactively accessing information stored in a memory in response to a user command having a predefined operator and specifying one of a plurality of collections of information, the collections of information being stored in an object-oriented database in a hierarchical arrangement of data members, in which one level of the hierarchical arrangement is composed of data members and in which one of the data members is composed of a next level of data members, each data member being stored according to one of a system-specified and a user-specified storage definition, the system comprising:

means in the memory for defining a set of user-specified storage definitions from the plurality of storage definitions;

means for detecting the user command;

means in the memory for analyzing the collection of information, specified in the user command, to determine which data members of the one level are stored according to one of the storage definitions of the set;

means in the memory for adding each data member not in the set to a projection list;

means in the memory for expanding each data member in the set into the next level of data members composing the data member in the set, the means for expanding including means for adding each data member of the next level not in the set to the projection list and including means for expanding each data member of the next level in the set into a subsequent level of data members composing the data member of the next level; and means in the memory for processing the projection list to return the information corresponding to the data members in the projection list.

16. The system of claim 15 wherein the predefined operator includes information including a desired depth of traversal of the collection and wherein the means for expanding includes means for expanding levels of the data arrangement until all data members are found as not being in the set or until the desired depth is expanded.

17. Apparatus for processing a query command having a predefined projection operator, to produce a projection list, the query command operating on an object-oriented database with typed data members including composite data members which refer to other data members and leaf data members, the apparatus being stored on a computer usable medium and comprising:

means for constructing a set of composite data member types;

means responsive to the predefined operator for comparing each data member type with data member types in the set;

means for placing each data member on the projection list when the data member type of the each data member is not on the list;

means for examining each other data member referred to by another data member when the data member type of the another data member is on the list.

18. The apparatus of claim 17 wherein the predefined projection operator includes information including a desired depth of traversal of the another data member.

19. A computer program product for processing a query command having a predefined projection operator, to produce a projection list, the query command operating on an object-oriented database with typed data members including composite data members which refer to other data members and leaf data members, the computer program product comprising a computer usable medium having computer readable program code thereon including:

means for constructing a set of composite data member types;

means responsive to the predefined operator for comparing each data member type with data member types in the set;

means for placing each data member on the projection list when the data member type of the each data member is not on the list;

means for examining each other data member referred to by another data member when the data member type of the another data member is on the list.

* * * * *